United States Patent
Irle

(10) Patent No.: US 12,157,478 B2
(45) Date of Patent: Dec. 3, 2024

(54) METHOD FOR A SENSOR ASSEMBLY, SENSOR ASSEMBLY, COMPUTER PROGRAM PRODUCT AND COMPUTER-READABLE MEDIUM

(71) Applicant: HELLA GmbH & Co. KGaA, Lippstadt (DE)

(72) Inventor: Henning Irle, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 590 days.

(21) Appl. No.: 17/211,359

(22) Filed: Mar. 24, 2021

(65) Prior Publication Data
US 2021/0206385 A1 Jul. 8, 2021

Related U.S. Application Data

(63) Continuation of application No. PCT/EP2019/073408, filed on Sep. 3, 2019.

(30) Foreign Application Priority Data
Sep. 24, 2018 (DE) ...................... 10 2018 123 391.4

(51) Int. Cl.
*B60W 50/02* (2012.01)
*B60W 50/00* (2006.01)

(52) U.S. Cl.
CPC . B60W 50/0205 (2013.01); *B60W 2050/0083* (2013.01); *B60W 2050/0215* (2013.01)

(58) Field of Classification Search
CPC ..... B60W 50/0205; B60W 2050/0083; B60W 2050/0215; G01P 15/18; G01P 21/00;
(Continued)

(56) References Cited

U.S. PATENT DOCUMENTS 9,457,775 B2 10/2016 Goers et al.
2004/0254690 A1 12/2004 Hasegawa et al.
(Continued)

FOREIGN PATENT DOCUMENTS

DE 10333997 A1 2/2005
DE 102013000205 A1 7/2014

OTHER PUBLICATIONS

International Search Report dated Nov. 29, 2019 in corresponding application PCT/EP2019/073408.

*Primary Examiner* — Ryan Rink
(74) *Attorney, Agent, or Firm* — Muncy, Geissler, Olds & Lowe, P.C.

(57) ABSTRACT

A method for a sensor assembly of a vehicle that includes self-calibration of the vehicle variable sensor of the sensor assembly, the actual location and/or the actual position of the sensor assembly being automatically ascertained and compared with at least one setpoint location and/or setpoint position for the at least one operating routine of the sensor assembly. Outputting an error message if the actual location and/or actual position automatically ascertained does not essentially match any of the at least one setpoint locations and/or setpoint positions or if the actual location and/or actual position automatically ascertained does essentially match one of the at least one setpoint locations and/or setpoint positions then storaging the operating routine of the sensor assembly correlating to this setpoint location and/or setpoint position of the sensor assembly for a subsequent operation of the self-calibrated vehicle variable sensor of the sensor assembly.

10 Claims, 2 Drawing Sheets

(58) Field of Classification Search
CPC ........ B60G 2600/08; B60G 2800/7022; G01D 18/00
See application file for complete search history.

(56) References Cited

U.S. PATENT DOCUMENTS

| | | | |
|---|---|---|---|
| 2010/0218588 A1* | 9/2010 | Staniewicz | G01D 5/2497 |
| | | | 73/1.75 |
| 2015/0224986 A1* | 8/2015 | Heinrichs-Bartscher | ............ |
| | | | B60W 30/08 |
| | | | 701/101 |
| 2015/0253352 A1* | 9/2015 | Bechtler | G01P 21/00 |
| | | | 701/33.1 |
| 2018/0188032 A1* | 7/2018 | Ramanandan | G01S 19/52 |
| 2020/0209369 A1* | 7/2020 | Koch | G01S 7/4972 |

* cited by examiner

METHOD FOR A SENSOR ASSEMBLY, SENSOR ASSEMBLY, COMPUTER PROGRAM PRODUCT AND COMPUTER-READABLE MEDIUM

This nonprovisional application is a continuation of International Application No. PCT/EP2019/073408, which was filed on Sep. 3, 2019, and which claims priority to German Patent Application No. 10 2018 123 391.4 which was filed in Germany on Sep. 24, 2018 and which are both herein incorporated by reference.

BACKGROUND OF THE INVENTION

Field of the Invention

The present invention relates to a method for a sensor assembly of a vehicle, a sensor assembly for a vehicle, a computer program product, and a computer-readable medium.

Description of the Background Art

Methods of this type for sensor assemblies, sensor assemblies, computer program products and computer-readable media are already known in numerous design variants from the prior art.

For example, a sensor assembly for a land vehicle is known from DE 103 33 997 B4, the sensor assembly including a level sensor for measuring the relative location of at least one wheel with respect to a body of the land vehicle, and at least one acceleration sensor being arranged in a housing of the level sensor.

SUMMARY OF THE INVENTION

It is therefore an object of the present invention to simplify the use of a sensor assembly in a vehicle This object is achieved by an exemplary method, which includes the following method steps: Self-calibration of a vehicle variable sensor of the sensor assembly in a self-calibration routine of the sensor assembly, preferably after the sensor assembly is installed in the vehicle, the actual location and/or the actual position of the sensor assembly being automatically ascertained with the aid of the sensor assembly and compared with at least one previously defined setpoint location and/or setpoint position of the sensor assembly stored in the sensor assembly for the at least one operating routine of the sensor assembly, and output of an error message if the actual location and/or actual position of the sensor assembly automatically ascertained with the aid of the sensor assembly does not essentially match any of the at least one setpoint location and/or setpoint position of the sensor assembly, or if the actual location and/or actual position of the sensor assembly automatically ascertained with the aid of the sensor assembly does essentially match one of the at least one setpoint location and/or setpoint position of the sensor assembly, storage of the operating routine of the sensor assembly correlating with this setpoint location and/or setpoint position for a subsequent operation of the self-calibrated vehicle variable sensor of the sensor assembly.

An essential advantage of the invention is, in particular, that the use of a sensor assembly in a vehicle is simplified. The self-calibration according to the invention of the vehicle variable sensor of the sensor assembly makes it possible, for example, to design the sensor assembly according to the sensor assembly having the vehicle variable sensor as an equivalent part, and to install this equivalent part in an arbitrary location and/or position on the vehicle within the technical limits. This is advantageous, in particular if a plurality of a vehicle variable sensor for detecting a vehicle variable is installed in different positions of the sensor assembly on the vehicle and/or in different locations of the sensor assembly on the vehicle. The invention makes this possible in a particularly easy manner in that an actual location and/or an actual position of the sensor assembly is automatically ascertained with the aid of the sensor assembly itself and compared with at least one previously defined and stored setpoint location and/or setpoint position of the sensor assembly for at least one operating routine of the sensor assembly for a subsequent operation of the vehicle variable sensor self-calibrated in this manner.

The vehicle variable sensor of the sensor assembly according to the invention is thus designed and configured ahead of time for at least one operating routine of the sensor assembly correlating to at least one setpoint location and/or setpoint position of the sensor assembly, the at least one operating routine being automatically selected in the self-calibration routine of the sensor assembly by means of the automatic ascertainment of the actual location and/or actual position of the sensor assembly and stored for the later operation of the vehicle variable sensor of the sensor assembly. If the at least one operating routine is not ascertainable by means of the procedure mentioned above, i.e. if the actual location and/or the actual position of the sensor assembly automatically ascertained with the aid of the sensor assembly do/does not essentially match any of the at least one setpoint locations and/or setpoint positions of the sensor assembly, an error message is output in the way known to those skilled in the art. It is correspondingly ensured that the vehicle variable sensor of the sensor assembly and system of the vehicle cooperating therewith do not operate in an undesirable manner. The invention may be advantageously used, for example during an initial assembly of the vehicle and thus during an initial mounting of the sensor assembly according to the invention. In addition, the invention is also advantageous in a maintenance situation, for example during a repair or a replacement of the sensor assembly or the vehicle variable sensor of the sensor assembly.

The particular position of the sensor assembly is understood to be the arrangement of the sensor assembly as such, i.e. for example a center of gravity of the sensor assembly relative to the rest of the vehicle. The spatial arrangement of the sensor assembly relative to the rest of the vehicle is meant by the particular location of the sensor assembly.

In principle, it is conceivable that only a single setpoint location and/or a single setpoint position of the sensor assembly is/are previously defined and stored with respect to a single correlating operating routine of the sensor assembly for operating the self-calibrated vehicle variable sensor. One particularly advantageous refinement of the method according to the invention provides that a plurality of different setpoint locations and/or setpoint positions of the sensor assembly are stored with respect to a plurality of correlating and different operating routines for the sensor assembly. For example, the installation of a plurality of sensor assemblies designed as equivalent parts at different positions of the sensor assembly and/or in different locations of the sensor assembly is made possible hereby.

Another advantageous refinement of the method according to the invention provides that the operating routine automatically ascertained with the aid of the self-calibration routine is stored unchanged for the subsequent operation of the self-calibrated vehicle variable sensor of the sensor assembly. This ensures that the operating routine, once it is ascertained and stored, may not be manipulated later on in an undesirable manner for operating the vehicle variable sensor of the sensor assembly. In contrast thereto, however, it is conceivable, in principle, that the operating routine automatically ascertained with the aid of the self-calibration routine is stored with changes for the subsequent operation of the self-calibrated vehicle variable sensor of the sensor assembly. For example, this would make it possible to configure the sensor assembly for another self-calibration routine according to the invention. This could take place with the aid of a reset switch or the like.

Another advantageous refinement of the method according to the invention provides that the self-calibration routine is automatically started with a first-time voltage supply of the sensor assembly. The self-calibration routine may be particularly easily triggered hereby. For example, the self-calibration routine may be started by an electrical connection of the sensor assembly to a voltage supply, for example the vehicle battery, during the initial assembly of the vehicle at the end of the assembly line or in a repair shop in the case of a maintenance.

In principle, the triggering of the self-calibration routine is freely selectable within broad, suitable parameters, depending on type and functionality. This also applies to the termination thereof. In this regard, one advantageous refinement of the method according to the invention provides that the self-calibration routine is automatically terminated after a first-time matching of the actual location and/or the actual position of the sensor assembly with one of the at least one stored setpoint locations and/or setpoint positions of the sensor assembly. In this way, the termination of the self-calibration routine is made possible only with little complexity.

A particularly advantageous refinement of the method according to the invention provides that the operating routine of the at least one operating routine automatically ascertained with the aid of the self-calibration routine and stored for the subsequent operation of the self-calibrated vehicle variable sensor of the sensor assembly is automatically started with a further voltage supply of the sensor assembly which is subsequent to the first-time voltage supply of the sensor assembly. The start of the operating routine of the sensor assembly according to the invention is easily implemented hereby. For example, the operating routine may be started by an owner of the vehicle with the aid of the first-time startup of the vehicle.

In principle, the automatic ascertainment of the actual location and/or actual position of the sensor assembly according to the invention is freely selectable within broad, suitable parameters, depending on type and functionality. One advantageous refinement of the method according to the invention provides that the automatic ascertainment of the actual location and/or actual position of the sensor assembly takes place in the self-calibration routine thereof as a function of at least one acceleration measurement of at least one acceleration sensor of the sensor assembly. The actual location and/or the actual position of the sensor assembly according to the invention is metrologically easily ascertainable in this manner.

A particularly advantageous refinement of the aforementioned specific embodiment of the method according to the invention provides that the at least one acceleration sensor is designed as a three-axis sensor, and the automatic ascertainment of the actual location and/or actual position of the sensor assembly takes place in each case as a function of an acceleration measurement along a measuring axis of the three-axis sensor. The actual location and/or actual position of the sensor assembly according to the invention is/are metrologically particularly easily ascertainable in this manner. The reason for this is that a coordinate transformation is made possible in all three spatial directions with the aid of the measurement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein.

DETAILED DESCRIPTION

Figure 1:
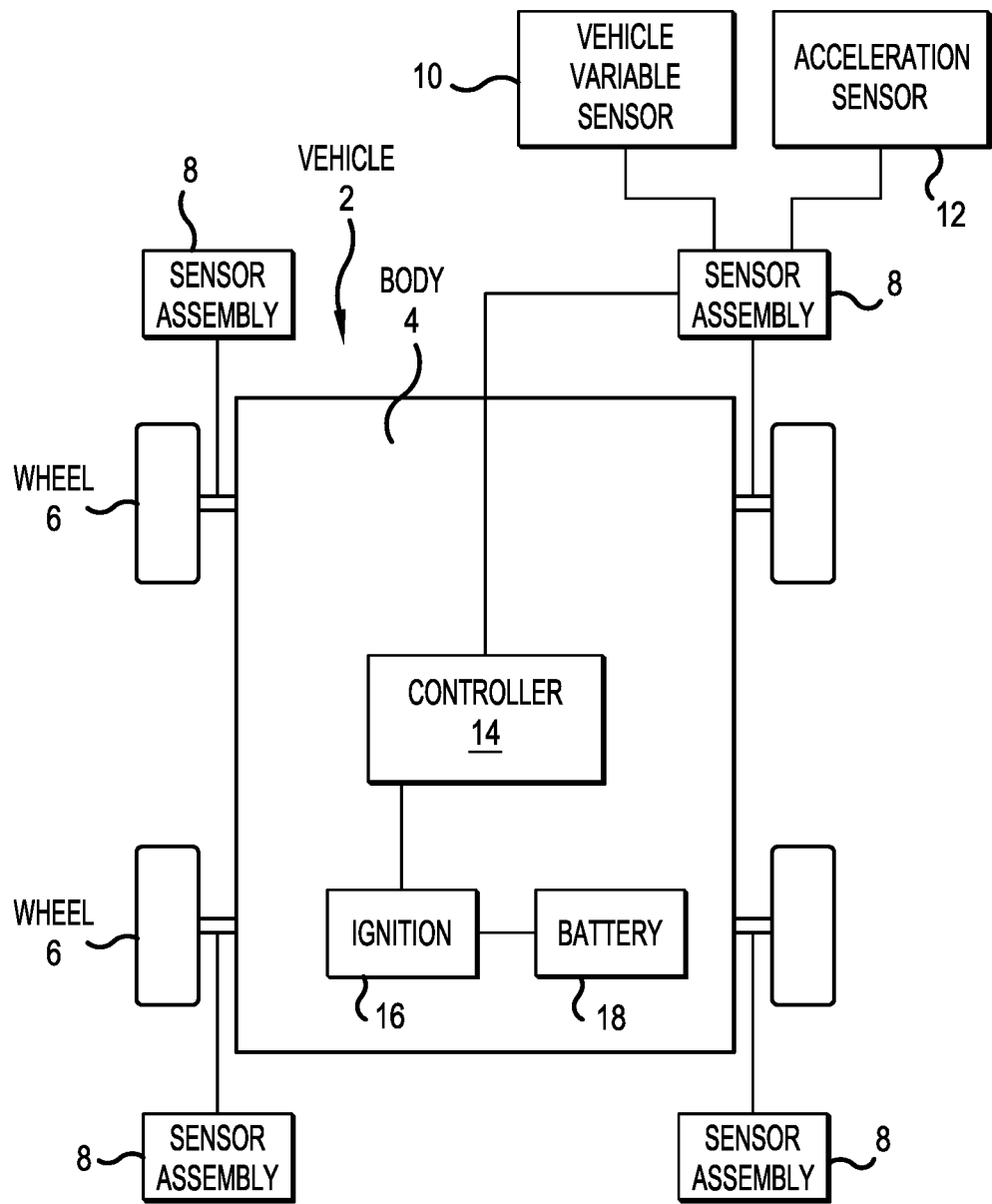
FIG. 1 shows an exemplary embodiment of a sensor assembly according to the invention and FIG. 2 shows an exemplary embodiment of a method of the sensory assembly.

FIG. 1_shows an exemplary embodiment of the invention for a vehicle 2 designed as a passenger car by way of example. Four wheels 6 are arranged on a body 4 of vehicle 2, with the aid of each of which one sensor assembly 8 is operatively connected in the manner known to those skilled in the art. A total of four sensor assemblies 8 according to the invention are thus installed on vehicle 2, the four sensor assemblies 8 being designed as equivalent parts. Sensor assemblies 8 each include a vehicle variable sensor 10 designed as a vehicle level sensor as well as an acceleration sensor 12 designed as a three-axis sensor. For the sake of clarity, only one of the four sensor assemblies 8 is illustrated in detail in the figure. Due to the design as equivalent parts, remaining sensor assemblies 8 have the same design and configuration as this sensor assembly. Due to their design as three-axis sensors, the location and position of particular sensor assembly 8 may be ascertained with the aid of each of acceleration sensors 12 in the manner known to those skilled in the art. The position of the particular sensor assembly is understood to be, e.g., the center of gravity of sensor assembly 8 relative to the rest of vehicle 2. The spatial arrangement of this sensor assembly 8 relative to the rest of vehicle 2 is meant by the location of particular sensor assembly 8. For example, the spatial location of sensor assembly 8 illustrated at the upper right in the image plane of the figure is the one at this point on vehicle 2.

Sensor assemblies 8 including vehicle variable sensors 10 and acceleration sensors 12 are each connected in a signal transmitting manner to a controller 14 of vehicle 2 in the manner known to those skilled in the art. Sensor assemblies 8 are connected in a current-conducting manner to a battery 18 of vehicle 2 with the aid of controller 14 and an ignition 16. Similarly to the discussion above, the aforementioned connections of the four sensor assemblies 8 are also shown only for one of the four sensor assemblies 8 in the FIGURE for the sake of clarity.

Figure 2:
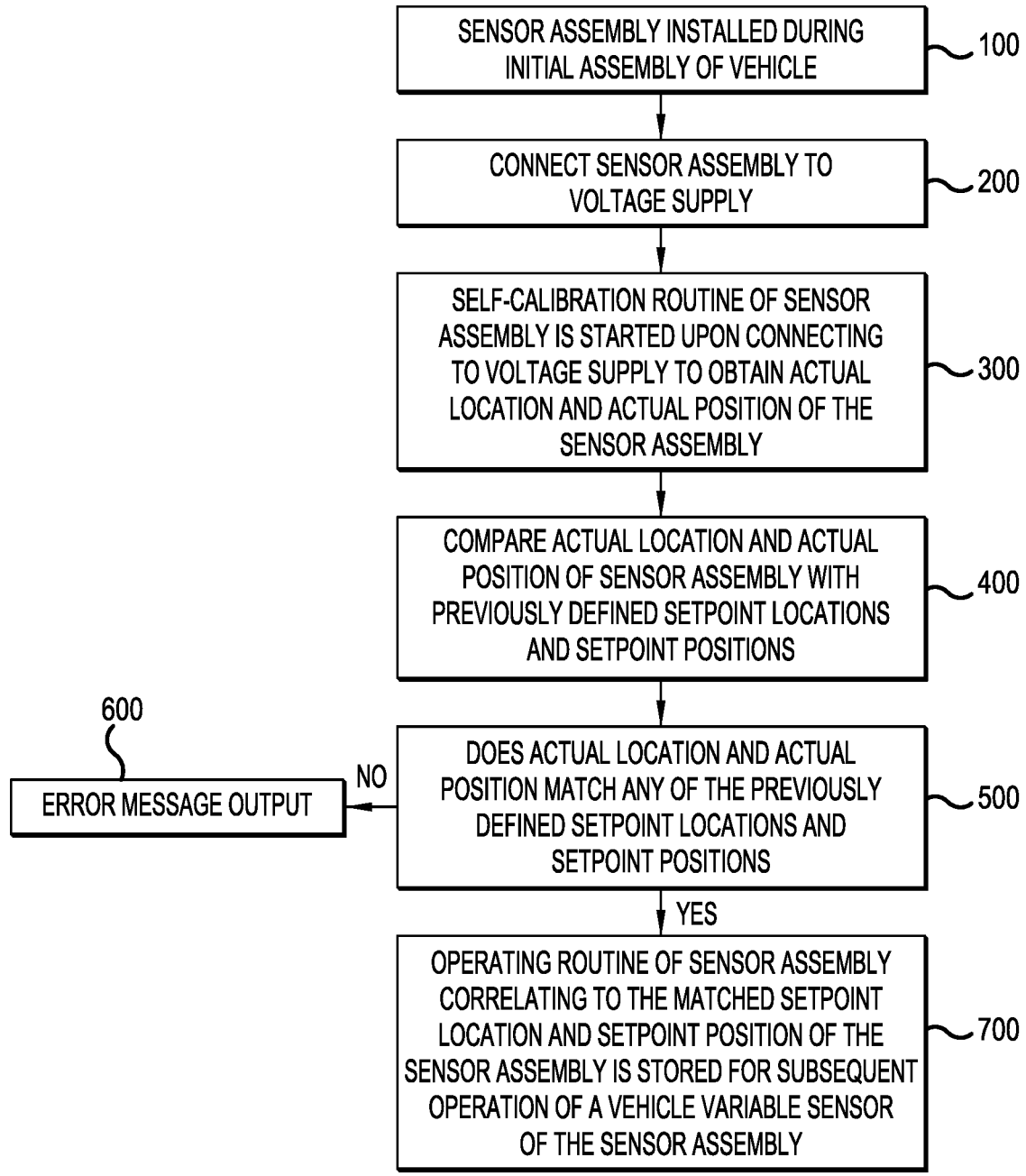

The method according to the invention is explained in greater detail below according to the present exemplary embodiment and based on FIG. 2.

During the initial assembly of vehicle 2, in step 100, the four sensor assemblies 8 are each installed at the positions apparent from the figure in a location determined by the particular installation situation in the manner known to those skilled in the art. The four sensor assemblies 8 are not placed into operation ahead of time, i.e. they are not yet connected to a voltage supply.

After installing the four sensor assemblies 8 in vehicle 2, the assembler connects, in step 200, each of the four sensor assemblies 8 to a voltage supply, for example to battery 18. The four sensor assemblies 8 are now provided with a power supply for the first time. The four sensor assemblies 8 are designed and configured in such a way that a self-calibration routine of particular sensor assembly 8 is automatically started with the first-time voltage supply of particular sensor assembly 8, in step 300. Upon running the self-calibration routine, a self-calibration of vehicle variable sensor 10 of particular sensor assembly 8 takes place, the actual location and the actual position of particular sensor assembly 8 being automatically ascertained with the aid of this sensor assembly 8 and compared, in step 400, with four previously defined setpoint locations and setpoint positions of this sensor assembly 8 stored in this sensor assembly 8 for a total of four operating routines of this sensor assembly 8. As already explained above, the four sensor assemblies 8 mounted on vehicle 2 are equivalent parts. Correspondingly, the four previously defined and stored setpoint locations and setpoint positions for one of the four operating routines of particular sensor assembly 8 correlate in each case to the four different locations and positions of sensor assemblies 8 apparent from the figure.

Correspondingly, a first previously defined and stored setpoint location and setpoint position for a first operating routine of particular sensor assembly 8 correlates to an actual location and actual position of one of sensor assemblies 8 illustrated at the bottom left in the image plane of the FIGURE, a second previously defined and stored setpoint location and setpoint position for a second operating routine of particular sensor assembly 8 correlates to an actual location and actual position of one of sensor assemblies 8 illustrated at the bottom right in the image plane of the FIGURE, a third previously defined and stored setpoint location and setpoint position for a third operating routine of particular sensor assembly 8 correlates to an actual location and actual position of one of sensor assemblies 8 illustrated at the upper left in the image plane of the FIGURE, and a fourth previously defined and stored setpoint location and setpoint position for a fourth operating routine of particular sensor assembly 8 correlates to an actual location and actual position of one of sensor assemblies 8 illustrated at the upper right in the image plane of the FIGURE.

For each sensor assembly 8 of vehicle 2, a plurality of different setpoint locations and setpoint positions of this sensor assembly 8 is thus stored for a plurality of different operating routines for this sensor assembly 8 correlating thereto. Due to the design of the four sensor assemblies 8 as equivalent parts, the particular configuration of the four sensor assemblies 8 relating thereto is identical.

The particular self-calibration routine of the four sensor assemblies 8 of vehicle 2 takes place as a function of output signals of acceleration sensor 12 of particular sensor assembly 8. For this purpose, particular acceleration sensor 12 designed as a three-axis sensor measures the acceleration of corresponding sensor assembly 8 in all three spatial directions. The actual location and the actual position of particular sensor assembly 8 of vehicle 2 is then automatically ascertained by means of coordinate transformation. The actual location and actual position of particular sensor assembly 8 ascertained in this manner is then compared with the stored setpoint locations and setpoint positions of this sensor assembly 8 assigned in each case to an operating routine of particular sensor assembly 8 in the manner described below.

If the actual location and actual position of this sensor assembly 8 automatically ascertained with the aid of particular sensor assembly 8 does not essentially match any of the four previously defined setpoint locations and setpoint positions of this sensor assembly 8 stored in this sensor assembly 8, in step 500, an error message is output with the aid of this sensor assembly 8 and controller 14 in the manner known to those skilled in the art, in step 600.

If the actual location and actual position of this sensor assembly 8 automatically ascertained with the aid of particular sensor assembly 8 does essentially match one of the four previously defined setpoint locations and setpoint positions of this sensor assembly 8 stored in this sensor assembly 8, the operating routine of this sensor assembly 8 correlating to this setpoint location and setpoint position of this sensor assembly 8 is stored for a subsequent operation of self-calibrated vehicle variable sensor 10 of this sensor assembly 8, in step 700.

To prevent an undesirable manipulation of sensor assemblies 8 of vehicle 2 later on, the operating routine for particular sensor assembly 8 automatically ascertained with the aid of the particular self-calibration routine is stored unchanged for the subsequent operation of self-calibrated vehicle variable sensor 10 of this sensor assembly 8.

In the latter case, i.e. if the actual location and actual position of this sensor assembly 8 automatically ascertained with the aid of particular sensor assembly 8 essentially match one of the four previously defined setpoint locations and setpoint positions of this sensor assembly 8 stored in this sensor assembly 8, the particular self-calibration routine is automatically terminated after a first-time matching of the actual location and the actual position of particular sensor assembly 8 with one of the four stored setpoint locations and setpoint positions of this sensor assembly 8.

The four sensor assemblies 8 of vehicle 2 are furthermore designed and configured in such a way that the operating routine automatically ascertained with the aid of the particular self-calibration routine and stored for the subsequent operation of self-calibrated vehicle variable sensor 10 of this sensor assembly 8 is automatically started with the aid of a further voltage supply of this sensor assembly 8 which is subsequent to the first-time voltage supply of this sensor assembly 8. For example, this takes place during an initial startup of vehicle 2 with the aid of ignition 16 by an owner of vehicle 2.

The invention is not limited to present exemplary embodiment. For example, the invention may also be advantageously used in other vehicles. The vehicle variable sensor is not limited to the field of vehicle level sensors. Instead, the vehicle variable sensor as well as the vehicle variable detected with the aid of the vehicle variable sensor may be, within suitable parameters, any arbitrary vehicle variable sensor and any arbitrary vehicle variable depending on the type, function, dimensioning, material, arrangement and quantity. Instead of a plurality of different setpoint locations and/or setpoint positions of the sensor assembly being stored for a plurality of different operating routines correlating thereto for the sensor assembly, only a single previously defined and stored setpoint location and/or setpoint position may also be provided for only a single operating routine of the sensor assembly. In this case, there would also be only a single permissible setpoint location and/or setpoint position for the sensor assembly. It is furthermore not absolutely necessary that both an actual location and an actual position of the sensor assembly according to the invention be detected and compared with at least one previously defined and stored setpoint location and setpoint position. In contrast thereto, only one actual location or one actual position may be detected and compared with at least one previously defined and stored setpoint location or setpoint position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for a sensor assembly of a motor vehicle comprising a vehicle variable sensor for detecting at least one vehicle variable in at least one operating routine of the sensor assembly, the method comprising:
    self-calibrating the vehicle variable sensor of the sensor assembly in a self-calibration routine of the sensor assembly after the sensor assembly is installed in the vehicle, an actual arrangement of the sensor assembly with respect to the vehicle being automatically ascertained via the sensor assembly and compared with at least one previously defined setpoint arrangement of the sensor assembly with respect to the vehicle that is stored in the sensor assembly for the at least one operating routine of the sensor assembly; and
    outputting an error message if the actual arrangement of the sensor assembly with respect to the vehicle automatically ascertained via the sensor assembly does not essentially match any of the at least one previously defined setpoint arrangement of the sensor assembly with respect to the vehicle, or, if the actual arrangement of the sensor assembly with respect to the vehicle automatically ascertained via the sensor assembly does essentially match one of the at least one previously defined setpoint arrangement of the sensor assembly with respect to the vehicle, storing an operating routine of the sensor assembly correlating to the one of the at least one previously defined setpoint arrangement for a subsequent operation of the vehicle variable sensor of the sensor assembly,
    wherein the vehicle variable sensor is a vehicle level sensor.

2. The method according to claim 1, wherein a plurality of different setpoint arrangements of the sensor assembly is stored for a plurality of different operating routines for the sensor assembly correlating thereto.

3. The method according to claim 1, wherein the operating routine correlating to the one of the at least one previously defined setpoint arrangement is stored unchanged for the subsequent operation of the vehicle variable sensor of the sensor assembly.

4. The method according to claim 1, wherein the self-calibration routine is automatically started with a first-time voltage supply of the sensor assembly.

5. The method according to claim 1, wherein the self-calibration routine is automatically terminated after a first-time matching of the actual arrangement of the sensor assembly with the one of the at least one previously defined setpoint arrangement of the sensor assembly.

6. The method according to claim 4, wherein the operating routine that is stored for the subsequent operation of the vehicle variable sensor of the sensor assembly is automatically started with a further voltage supply of the sensor assembly that is subsequent to the first-time voltage supply of the sensor assembly.

7. The method according to claim 1, wherein the automatic ascertainment of the actual arrangement of the sensor assembly in the self-calibration routine thereof takes place as a function of at least one acceleration measurement of at least one acceleration sensor of the sensor assembly.

8. The method according to claim 7, wherein the at least one acceleration sensor is designed as a three-axis sensor, and the automatic ascertainment of the actual arrangement of the sensor assembly takes place in each case as a function of the at least one acceleration measurement along a measuring axis of the three-axis sensor.

9. A sensor assembly for a vehicle, the sensor assembly comprising:
    a vehicle variable sensor to detect at least one vehicle variable in at least one operating routine of the sensor assembly, designed and configured to carry out a self-calibration routine of the sensor assembly subsequent to the at least one operating routine, wherein the sensor assembly is designed and configured in such a way that the method according to claim 1 is carried out,
    wherein the vehicle variable sensor is a vehicle level sensor.

10. A non-transitory computer-readable medium, on which a computer program is stored that, when executed by a computer, causes a sensor assembly to carry out the method according to claim 1.

* * * * *